April 17, 1962  G. H. BENNETT  3,030,138
LIFTING, LOADING OR STACKING EQUIPMENT
Filed April 8, 1959  6 Sheets-Sheet 1
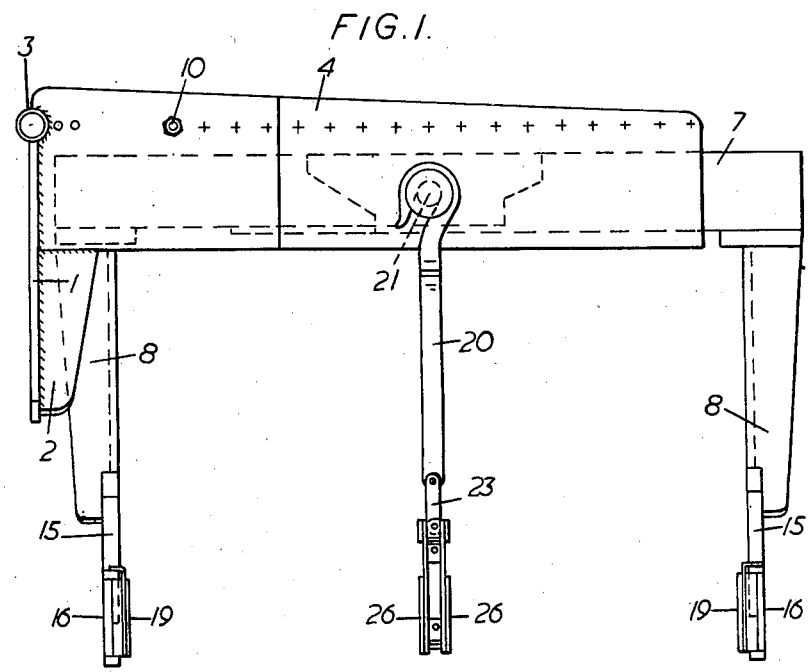
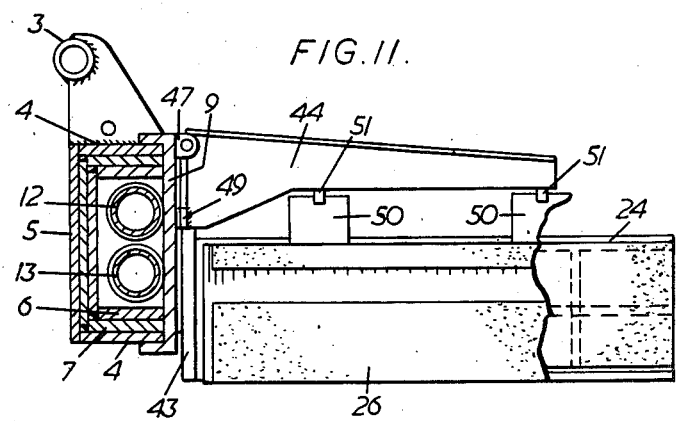
Inventor:
GORDON HENRY BENNETT
By Richardson, David and Nordon
Attorneys.

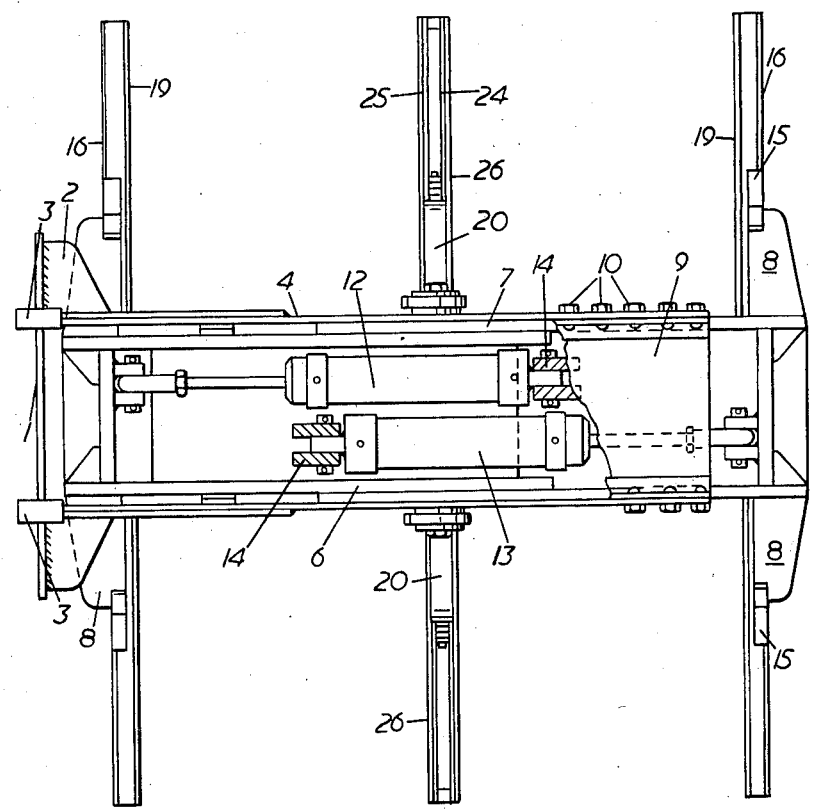

April 17, 1962 G. H. BENNETT 3,030,138
LIFTING, LOADING OR STACKING EQUIPMENT
Filed April 8, 1959 6 Sheets-Sheet 3
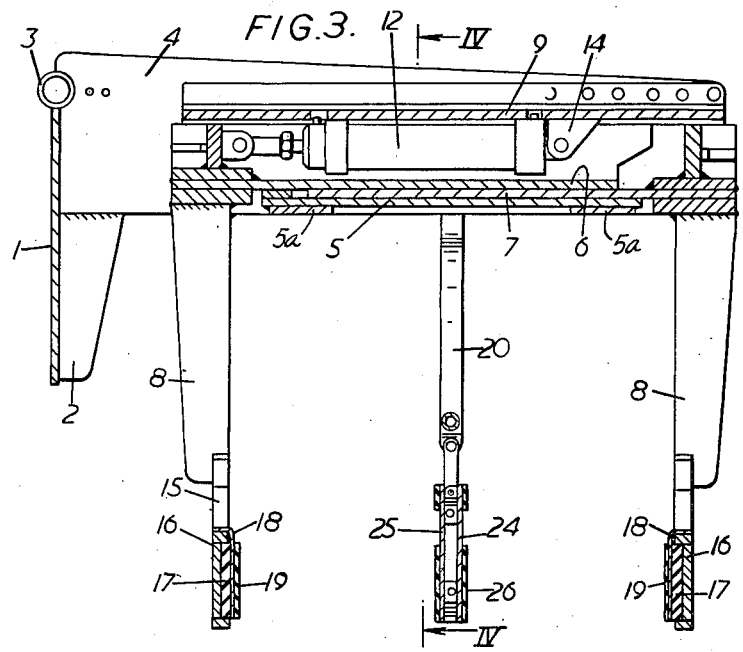
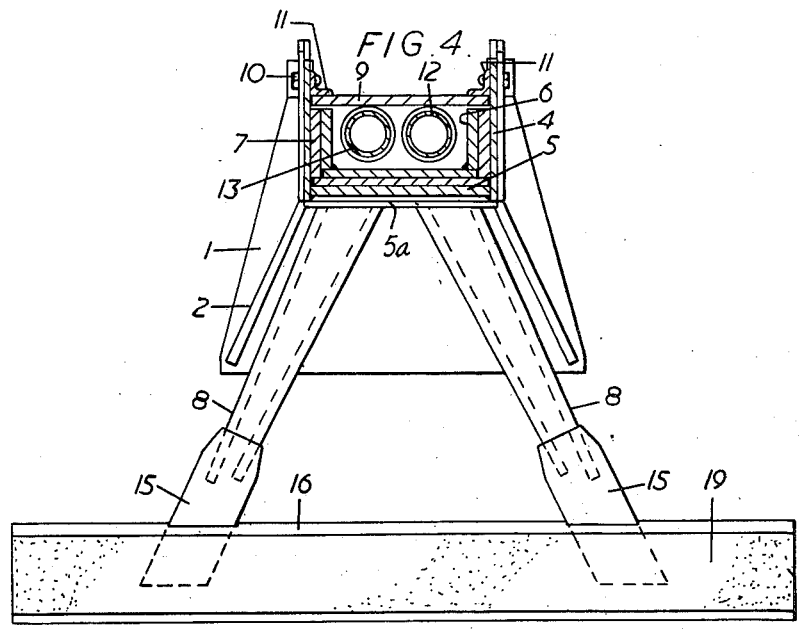
Inventor:
GORDON HENRY BENNETT
By
Richardson, David and Nardon
Attorneys April 17, 1962   G. H. BENNETT   3,030,138
LIFTING, LOADING OR STACKING EQUIPMENT
Filed April 8, 1959   6 Sheets-Sheet 4

Inventor:
GORDON HENRY BENNETT

By
Richardson, David and Nardon
Attorneys.

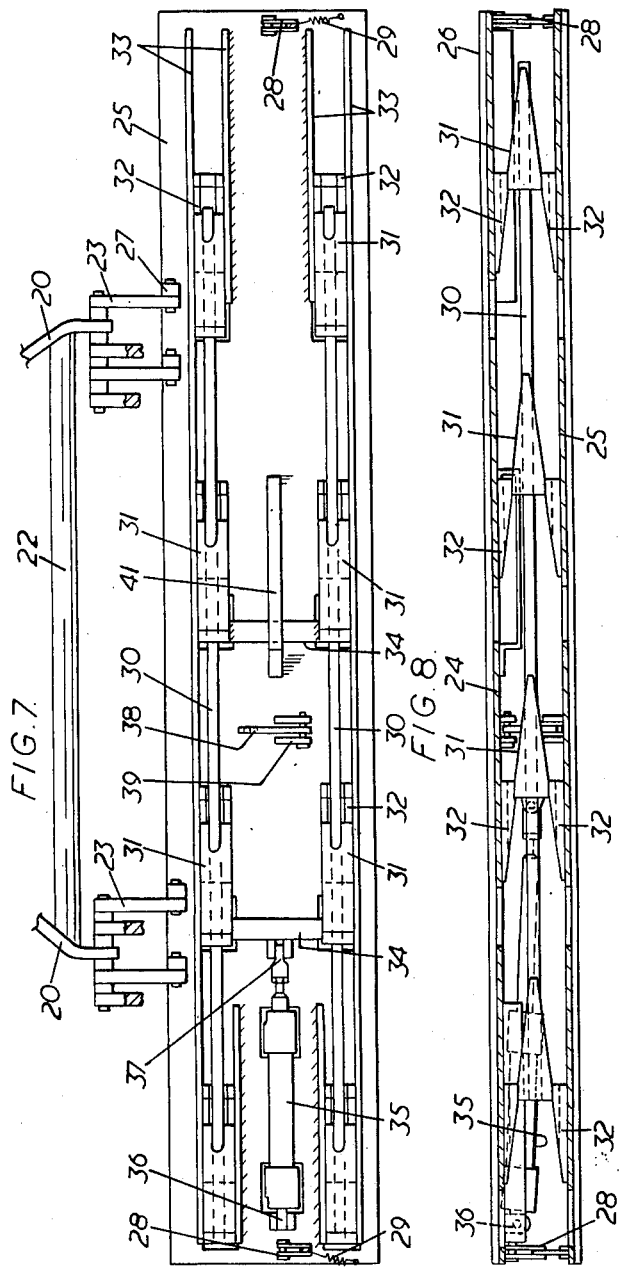

April 17, 1962 G. H. BENNETT 3,030,138
LIFTING, LOADING OR STACKING EQUIPMENT
Filed April 8, 1959 6 Sheets-Sheet 6
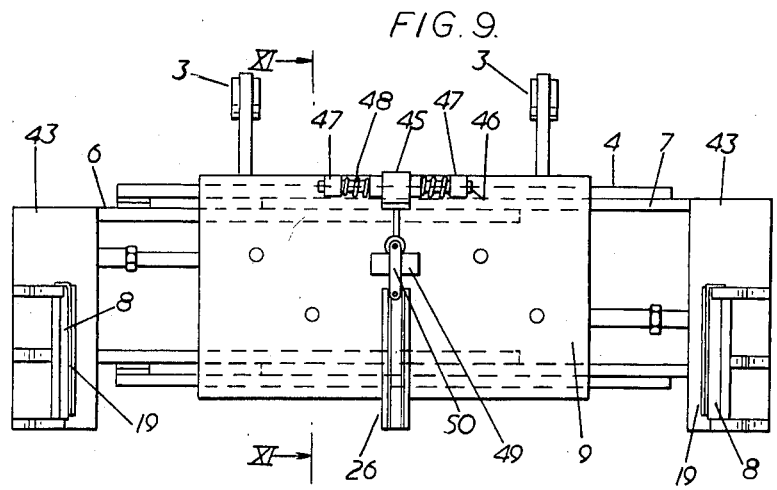
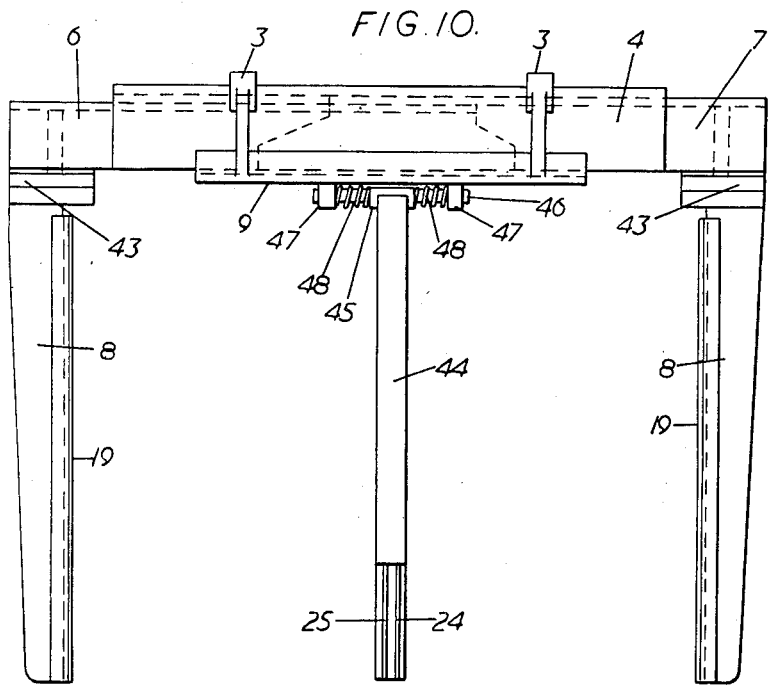
Inventor:
GORDON HENRY BENNETT
By
Richardson, David and Nordon
Attorneys.

United States Patent Office 3,030,138
Patented Apr. 17, 1962

3,030,138
LIFTING, LOADING OR STACKING EQUIPMENT
Gordon H. Bennett, Brooklyn, 37 Cross Park Road,
Crownhill, Plymouth, England
Filed Apr. 8, 1959, Ser. No. 804,974
Claims priority, application Great Britain Apr. 9, 1958
7 Claims. (Cl. 294—63)

This invention relates to lifting, loading or stacking equipment, and is concerned more especially with gripping means whereby comparatively fragile articles can be securely held for the purpose of lifting, loading or stacking.

The object of the invention is to provide simple and efficient gripping means which, while enabling more articles to be gripped and lifted than by known devices, nevertheless reduces the risk of crushing or other damage to the articles in question. While the invention is suitable for gripping articles of any kind, it has very useful applications in the lifting and stacking of precast concrete blocks which are not fully hardened, and/or comparatively fragile articles such as cartons partly or fully packed with goods.

The invention consists in gripping means for lifting, loading or stacking equipment comprising two channel elements nested one within the other each power operated and longitudinally slidable in relation to the other and to a common support, each element at its outer end carrying a laterally-projecting gripping member rigidly secured thereto.

The invention further consists in gripping means for lifting, loading or stacking equipment comprising two rigid gripper arms with gripping surfaces secured thereto, movable towards and away from one another, and one or more intermediate gripping members located between the gripping surfaces of the rigid arms.

The invention will be clearly understood from the following description of forms (given, however, merely by way of example) which it may assume, and this description will be more readily followed by reference to the accompanying drawings wherein:

FIGURES 1 and 2 represent respectively a side view, and a plan view with cover plate broken away, of gripping means for lifting equipment according to the invention.

FIGURE 3 represents a sectional side view of the device shown in FIGURES 1 and 2.

FIGURE 4 represents a transverse sectional view along the line IV—IV of FIGURE 3.

FIGURE 7 is a side view along the line VII—VII of FIGURE 5.

FIGURE 8 is a sectional plan view along the line VIII—VIII of FIGURE 6, and

FIGURES 9, 10 and 11 represent respectively front view, plan view and a side sectional view of a modified form of gripping device according to the invention, FIGURE 11 representing a section along the line XI—XI of FIGURE 9.

Figure 5:
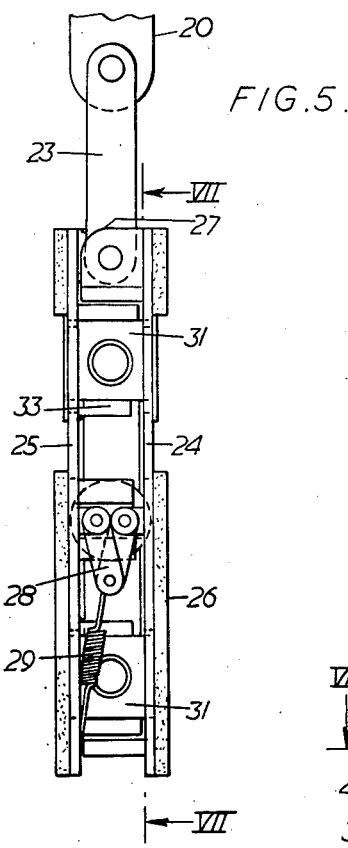
FIGURES 5 and 6 represent respectively an end view in contracted state, and a transverse section in expanded state, of an intermediate gripping member incorporated in the device shown in FIGURES 1–3.
Figure 6:
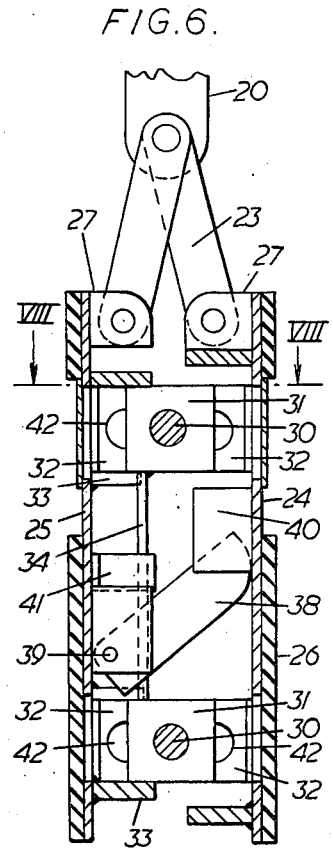

In carrying the invention into effect in one convenient manner, as shown in FIGURES 1–8 of the drawings herewith, a grippig device for use in lifting, loading or stacking articles, e.g., partially hardened pre-cast concrete blocks, or cartons packed with goods, comprises an end plate 1 having reinforcing ribs or plates 2, and ring lugs or brackets 3 whereby the plate can be detachably secured to a conventional lifting device, e.g., to the hoist carriage of a fork lift or hoist truck. Secured to and projecting horizontally from the plate 1 is a cantilever arm formed of side plates 4, a base plate 5 extending between the lower edges of the side plates along a substantial mid-portion of the cantilever arm, which is thus substantially of channel form. Cross members 5a (FIGS. 3 and 4) extending between the lower edges of the side plates 4 provide additional support for the base plate 5.

In the U-sectioned cantilever arm are mounted, one within the other, for longitudinal movement, two slides 6, 7, each of channel section. The outer end of each slide 6, 7 carries downwardly projecting divergent arms 8, supporting a gripping pad described more fully below.

The cantilever arm is closed by a cover plate 9 between and secured to the side plates 4 by bolts 10 extending through flanges or angle members 11, and in the closed spaces between this cover 9 and the inner slide are located side by side two double acting hydraulic or pneumatic rams 12, 13, operable in opposite directions. Each ram at its rear end is articulated to lugs or brackets 14 affixed to the cover 9, and the piston rod of one ram 12 is linked to an end plate of one slide 6, while the piston rod of the other ram 13 is likewise linked to an end plate of the other slide 7.

Each pair of arms 8 terminate in plates 15 to which is rigidly secured a transverse vertical gripping pad formed of a rear plate 16 (FIGURE 3) in which is mounted a resilient strip 17 i.e., of rubber or the like, faced with a metal or like stiff plate 18 on which a thin surface layer 19 of soft or resilient material e.g., rubber is mounted. The plate may be of a shallow U-section as shown or otherwise.

The rams 12 and 13 are connected by flexible hose (not shown) to, and service by, a hydraulic or pneumatic pressure governable system e.g., of the truck on which the plate 1 is mounted, and it will be apparent that when the rams are operated the slides 6 and 7 are slidably moved inwards in relation to one another and thereby bring together their respective pairs of arms 8, in order to grip between the pads 16, 19 any article located between them, while on reverse operation the pads are separated to release the articles. The metal plates 18 on the resilient buffers 16 of the gripping pads ensure a uniform application of gripping force to the article while the surfacing 19 improves the frictional grip and avoids scratching or damage. The material being thin does not sag and so facilitates gripping at very low pressure.

In the form of the invention described above it is preferred to incorporate one or more intermediate gripping members between the end pads. Each intermediate member is preferably expansible to assist in the gripping action, and enables a plurality of articles, or a plurality of groups of articles to be gripped simultaneously. The form of the invention shown in FIGURES 1–4 is illustrated as fitted with one intermediate member, of which more detail is shown in FIGURES 5–8.

The intermediate member is pivotally suspended by hooked arms 20 engaged on fittings 21 on opposite sides of the cantilever arm and approximately at mid-points along its length, these arms diverging, in a manner similar to the arm 8, in order to carry the intermediate member which is dimensionally similar to the end gripping pads. Near their lower ends the arms 20 are strengthened by a strut 22 (FIGURE 7) extending between them, and have pivoted thereto link members 23 to support the intermediate member.

The intermediate member comprises two parallel plates 24, 25, of approximately the same dimensions as the end plates 16, each having externally a resilient facing 26 (which may be the same as the facing 17, 18, 19, fitted to the plates 16). Near to their upper edges the plates 24, 25 are provided with lugs 27 bolted to the links 23, to be supported thereby in a vertically dependent position at approximately the same level as the end plates 16, and parallel thereto. Near to their ends the plates 24, 25 are interconnected by pairs of links 28, and a tension spring 29 acting on the junction of the links 28 tends to fold the links together thus drawing together the plates 24, 25, and also limits the extent of opening of the plates 24, 25.

Means are provided between the plates 24, 25 for forcing the plates apart to expand the intermediate member. As shown in FIGURES 5–8 these means comprise cooperating wedge-shaped elements. A rod 30 has mounted thereon in spaced positions a plurality of full-taper wedge-elements 31 adapted to co-operate with pairs of half-taper wedge-elements 32 mounted in facing positions in the inner faces of the plates 24, 25. Two assemblies of a rod 30 with wedges 31 are mounted respectively in guides 33, and in association with fixed wedges 32, respectively near to the upper and lower edges of the plates 24, 25, and corresponding full-taper wedges 31 of the two assemblies are rigidly interconnected by rods 34. It will be apparent that longitudinal movement of the rods 30 causes the wedges 31 and 32, in co-operation, to force the plates 24, 25 apart, thus expanding the intermediate member, or in reverse sense allow them to come together in retraction. In order to effect such movement a ram 35 is pivoted at 36 inside one of the plates 24, and its shaft connected at 37 to a rod 34 of the slidable wedge assembly. The ram 35 is operated from the same pressure supply, hydraulic or pneumatic, as the rams 12, 13. It will be seen from the drawing that the wedges are tapered to flat. When fully extended the flat of the centre wedge rests against the flat of the half tapers so relieving back pressure on the ram when under full compression for lifting.

A cam-shaped plate 38 is pivoted between lugs 39 near to the mid-point of one of the plates 24 or 25 on its inner surface, and adapted to ride by its free end against the inner surface of the other plate, thereby stabilising the plates as they open and close. The free end of the cam-plate 38 may rise between guide lugs 40 on the other plate. A strip spring 41 forms a loop on the inner surface of one plate, e.g., 25, to steady the slidable wedge assembly by bearing on one of the rods 34 extending through the loop when the assembly is open for maintenance. The half-taper wedges 32 on the inner surface are formed with semi-cylindrical channels 42 to accommodate the rod 30 when the plates 24, 25 are closed together.

In a modified form of the invention shown in FIGURES 9–11 of the accompanying drawings the gripper arms, instead of depending from the slides and support extend in a horizontal direction therefrom. The supports 3 whereby the device can be secured to the hoist carriage of a lift truck or the like extend from the side of the main support formed by the side plates 4 and the rear plate 5, and equispaced from the mid-point of the main support. The slides 6, 7 slidably nested in the main support have secured to their outer ends front plates 43 to which are rigidly attached the forwardly projecting gripper arms 8 provided on their inner faces with gripping pads substantially as described above. The front plate 9 of the main support has attached to its inner surface rams 12, 13 which are connected to the outer ends of the slides 6, 7 in order to force them inwards or outwards, as previously described, for gripping and release operations.

An intermediate gripping member is supported by the plate 9 and for this purpose a bracket plate 44 has a boss 45 at its upper inner corner mounted on a rod 46 carried in and between lugs 47 near the upper edge and on the front face of the plate 9. The lugs 47 are equispaced from the centre line of the plate 9, and the bracket 44 is centralised on the rod 46 by springs 48. The bottom rear corner of the bracket 44 is fitted with slide or roller means 49 which bear against the plate 9. The intermediate member comprises two plates substantially identical with plates 24, 25 described above, slung by pivot plates 50 from spaced lugs 51 on the lower edge of the bracket 44. The intermediate gripper assembly is provided with means for expanding and retracting the plates, and these may be of any of the forms described above.

When a gripping device such as described above is mounted on the hoist carriage of a lift truck or the like the pneumatic or hydraulic rams are connected to the pressure system of the truck by high-pressure flexible hose, preferably by means of a self-sealing detachable union, and is thereupon ready to grip articles for the purpose of lifting, loading or stacking. The truck is advanced towards articles on the ground or on a supporting surface, so that the gripping pads 16, 19 extend beside a group of articles to be gripped, and the retracted intermediate member or members between articles of the group. Owing to its pivotal support and/or mobility the intermediate member can readily move to a position for insertion between the articles. Thereafter the intermediate member is expanded and the rams are operated, the slides and gripping pads being moved inwards to grip the articles for lifting and subsequent disposal and release.

From the above description it will be seen that the invention provides simple, effective and convenient gripping means for use with a lift truck or the like, but it should be understood that the invention is not limited solely to the details of the forms described above, which may be modified, in order to meet various conditions and requirements encountered, without departing from the scope of the invention.

What I claim is:

1. Gripping means for lifting, loading or stacking equipment, comprising: a main support for attachment to a conventional lifting device, a cantilever arm of channel section carried by said support, a pair of telescoping channel members, slidable one within the other within said cantilever arm, a pair of double acting fluid actuated rams each longitudinally movably connecting one of said channel members to said cantilever arm, a pair of projecting gripper arms, one thereof being rigidly attached to the outer end of each slidable member, a gripper member having a resilient gripping surface thereon mounted on the inner face of each gripper arm adjacent the end thereof, and at least one gripping member including a support arm attached to said cantilever arm at a point intermediate said gripper arm, said intermediate gripping member comprising two resilient surfaced gripping plates and means for forcing said plates apart to provide an expanding gripping action.

2. Gripping means according to claim 1 wherein each resilient gripping surface is provided by a resilient base lamina, a relatively rigid force distributing plate overlying and carried by said base lamina and a resilient work contacting base lamina overlying and carried by said force distributing plate.

3. Gripping means according to claim 2 wherein the intermediate gripping member is loosely mounted so as to allow self adjustment during location thereof between articles to be gripped.

4. Gripping means according to claim 3 wherein the means for forcing apart the gripping plates of the intermediate gripping member comprises movable fully tapered wedge-shaped elements cooperating with fixed half tapered wedge-shaped elements mounted on the interior surfaces of each plate and fluid actuated mechanism for relatively moving the movable wedges longitudinally with respect to the fixed wedges.

5. Gripping means according to claim 1 wherein the intermediate gripping member is loosely mounted so as to allow self-adjustment during location thereof between articles to be gripped.

6. Gripping means according to claim 5 wherein the means for forcing apart the gripping plates of the intermediate gripping member comprises movable fully tapered wedge-shaped elements cooperating with fixed half-tapered wedge-shaped elements mounted on the interior surfaces of each plate and fluid actuated mechanism for relatively moving the movable wedges longitudinally with respect to the fixed wedges.

7. Gripping means according to claim 1 wherein the means for forcing apart the gripping plates of the intermediate gripping member comprises movable fully tapered wedge-shaped elements cooperating with fixed half tapered wedge-shaped elements mounted on the interior surfaces of each plate and fluid actuated mechanism for relatively moving the movable wedges longitudinally with respect to the fixed wedges.

References Cited in the file of this patent

UNITED STATES PATENTS

| | | |
|---|---|---|
| 1,833,545 | Wehr | Nov. 24, 1931 |
| 2,076,204 | Martin | Apr. 6, 1937 |
| 2,284,238 | Todd | May 26, 1942 |
| 2,589,101 | Leguillon et al. | Mar. 11, 1952 |
| 2,636,768 | Hansen | Apr. 28, 1953 |
| 2,670,983 | Breslav | Mar. 2, 1954 |
| 2,821,316 | Saint | Jan. 28, 1958 |
| 2,874,862 | Farmer et al. | Feb. 24, 1959 |
| 2,896,994 | Fischer | July 28, 1959 |